(12) United States Patent
Goto

(10) Patent No.: US 9,815,434 B2
(45) Date of Patent: Nov. 14, 2017

(54) VEHICLE

(71) Applicant: HONDA MOTOR CO., LTD., Minato-ku, Tokyo (JP)

(72) Inventor: Taisuke Goto, Wako (JP)

(73) Assignee: Honda Motor Co., Ltd., Tokyo (JP)

(*) Notice: Subject to any disclaimer, the term of this patent is extended or adjusted under 35 U.S.C. 154(b) by 0 days.

(21) Appl. No.: 15/108,072

(22) PCT Filed: Dec. 16, 2014

(86) PCT No.: PCT/JP2014/083220
§ 371 (c)(1),
(2) Date: Jun. 24, 2016

(87) PCT Pub. No.: WO2015/098613
PCT Pub. Date: Jul. 2, 2015

(65) Prior Publication Data
US 2016/0325712 A1 Nov. 10, 2016

(30) Foreign Application Priority Data
Dec. 27, 2013 (JP) ................................. 2013-272673

(51) Int. Cl.
G06F 17/00 (2006.01)
B60S 1/08 (2006.01)
(Continued)

(52) U.S. Cl.
CPC ............ B60S 1/0896 (2013.01); B60J 5/101 (2013.01); B60J 5/105 (2013.01); B60S 1/583 (2013.01);
(Continued)

(58) Field of Classification Search
CPC ......... B60S 1/0896; B60S 1/583; B60J 5/101; B60J 5/105; E05B 77/00; E05B 81/58; E05B 81/62; E05B 81/64; E05B 83/18
(Continued)

(56) References Cited

U.S. PATENT DOCUMENTS 5,083,833 A 1/1992 Herrmeyer
5,764,010 A 6/1998 Maue et al.
(Continued)

FOREIGN PATENT DOCUMENTS

CN 1183081 A 5/1998
CN 101879882 A 11/2010
(Continued)

OTHER PUBLICATIONS

PCT/ISA/210 from PCT/JP2014/083220.
(Continued)

Primary Examiner — Muhammad Shafi
(74) Attorney, Agent, or Firm — Carrier Blackman & Associates, P.C.; Joseph P. Carrier; William D. Blackman

(57) ABSTRACT

A wheeled vehicle includes a rear opening that is formed in a rear surface of a vehicle body, a tailgate that is provided to open and close the rear opening, a sub door opening that is formed in a transverse portion of the tailgate, and a sub door that is provided to open and close the sub door opening. In the tailgate, a tailgate side window panel is provided on the tailgate, and a sub door side window panel is provided on the sub door. These tailgate side window panel and the sub door side window panel are made substantially level with each other while being disposed continuously in a transverse direction. The control unit prohibits the operation of a wiper device that moves over the individual window panels so as to clean and remove water therefrom, with the sub door left open.

16 Claims, 13 Drawing Sheets

(51) Int. Cl.
    *B60S 1/58*     (2006.01)
    *B60J 5/10*     (2006.01)
    *E05B 77/00*     (2014.01)
    *E05B 81/58*     (2014.01)
    *E05B 81/62*     (2014.01)
    *E05B 81/64*     (2014.01)
    *E05B 83/18*     (2014.01)

(52) U.S. Cl.
    CPC .............. *E05B 77/00* (2013.01); *E05B 81/58* (2013.01); *E05B 81/62* (2013.01); *E05B 81/64* (2013.01); *E05B 83/18* (2013.01); *B60S 1/08* (2013.01)

(58) Field of Classification Search
    USPC .......................................................... 701/48
    See application file for complete search history.

(56) References Cited

U.S. PATENT DOCUMENTS 6,111,378 A      8/2000    LeMay et al.
8,608,226 B2 *   12/2013    Farcas ...................... B60J 5/105
                                                                296/146.11
2012/0179336 A1 *   7/2012    Oakley ................... E05F 15/20
                                                                701/49
2014/0111391 A1 *   4/2014    Nagata ................... H01Q 1/325
                                                                343/713

FOREIGN PATENT DOCUMENTS

| | | |
|---|---|---|
| DE | 10 2005 044 569 A1 | 3/2007 |
| FR | 2 720 991 A1 | 12/1995 |
| JP | S62-052555 U | 4/1987 |
| JP | H04-262917 A | 9/1992 |
| JP | 2514650 Y2 | 10/1996 |
| JP | H08-268233 A | 10/1996 |
| JP | 2001-301579 A | 10/2001 |
| JP | 2006-282035 A | 10/2006 |

OTHER PUBLICATIONS

Office Action issued in the corresponding Chinese Patent Application 201480070903.5 dated Jun. 1, 2017.

Extended European search report dated Aug. 16, 2017 in the corresponding EP Patent Application 14875714.9.

* cited by examiner

VEHICLE

TECHNICAL FIELD

The present invention relates to an improved wheeled vehicle.

BACKGROUND ART

There is known a vehicle in which an opening is formed in a rear surface of a vehicle body and a door is provided which can open and close the opening. Patent Document 1 discloses a technique as a prior art technique in relation to such a vehicle.

In a wheeled vehicle disclosed in Patent Document 1, a tailgate is mounted at a rear portion of a vehicle body. This tailgate includes a pair of sub doors that are double doors that open respectively to the left and right. The tailgate swings up and down in an up-to-down or vertical direction, and the sub doors, which are the double doors opening respectively to the left and right, swing in left-to-right or transverse directions.

For example, in order to ensure obtain a rearward view through a backlight, it is considered that a window panel is mounted on each of the sub doors. As this occurs, it is desirable that a wiper device is mounted to clean and remove water from the window panels. When a wiper device is so mounted, it will be expensive in case a wiper device is mounted on each of the window panels. Owing to this, it is desirable that both the window panels are made level with each other and that a wiper device is used which can move over both the window panels so as to clean and remove water therefrom.

It is considered that the sub doors are erroneously opened while the wiper device is kept operating. Since a difference in level is generated between the window panels when the sub doors are opened, a measure is needed to counteract this problem from the viewpoint of projecting the wiper device.

PRIOR ART DOCUMENT

Patent Document

Patent Document 1: Japanese Utility Model Registration Publication No. 2,514,650

SUMMARY OF THE INVENTION

Problem to be Solved

The object of the present invention is to provide a vehicle that can protect a wiper device.

Means for Solving the Problem

According to an aspect of the present invention, there is provided a wheeled vehicle in which a rear opening is formed in a rear surface of a vehicle body, a tailgate is provided to open and close the rear opening, a sub door opening is formed in a transverse portion of the tailgate, and a sub door is provided to open and close the sub door opening, comprising:
a tailgate side window panel configured to be provided on the tailgate;
a sub door side window panel configured to be provided on the sub door;
a wiper device configured to move over the individual window panels so as to clean and remove water therefrom; and
a control unit configured to control the wiper device,
wherein the tailgate side window panel and the sub door side window panel are successively disposed with each other in a substantially same plane in a transverse direction, and
wherein when the sub door is opening, the control unit controls the wiper device so as not to be operated.

According to another aspect of the present invention, there is provided a wheeled vehicle in which a rear opening is formed in a rear surface of a vehicle body, a tailgate is provided to open and close the rear opening, a sub door opening is formed in a transverse portion of the tailgate, and a sub door is provided to open and close the sub door opening, comprising:
a tailgate side window panel configured to be provided on the tailgate;
a sub door side window panel configured to be provided on the sub door;
a wiper device configured to move over the individual window panels so as to clean and remove water therefrom;
a sub door latch device configured to engage the vehicle body with the sub door; and
a control unit configured to control the sub door latch device,
wherein the tailgate side window panel and the sub door side window panel are successively disposed with each other in a substantially same plane in a transverse direction, and
wherein when the wiper device is operating, the control unit controls the sub door latch device so as not to open the sub door.

It is preferable that the wheeled vehicle includes a sub door unlocking device configured to operate the sub door latch device and that when the wiper device is operating and the sub door unlocking device is operated, the control unit stops the wiper device after moving a blade of the wiper device to a stop position.

It is preferable that the control unit controls the sub door latch device so as to open the sub door when the wiper device stops in the stop position.

It is preferable that the wheeled vehicle includes a warning device configured to issue a warning and that the control unit executes a control to activate the warning device after the wiper device is stopped and before the control unit executes a control to open the sub door.

It is preferable that the control unit controls the sub door latch device so as to open the sub door when the sub door unlocking device is operated again after the wiper device has stopped.

It is preferable that the control unit executes a control to keep the wiper device stopping when the sub door is closed after the sub door is opened.

It is preferable that the control unit executes a control to activate the wiper device when the wheeled vehicle is running.

It is preferable that the control unit resumes an operation of the wiper device when the sub door is closed again after the sub door is opened.

It is preferable that the wheeled vehicle includes a warning device that issues a warning, and that the control unit controls the warning device so as to issue a warning before the operation of the wiper device is resumed after the sub door is closed again.

Effects of the Invention

According to the one aspect of the present invention, when the sub door is left open, the control unit executes a control to prohibit the operation of the wiper device. Owing to this, the wiper device can be activated to operate only when the tailgate side window panel and the sub door side window panel are level with each other. The wiper device can be prevented from being activated to operate when there is caused a different in level between the window panels, thereby making it possible to protect the wiper device.

The wheeled vehicle of the present invention is based on a premise that a door is mounted at a transverse portion of the rear portion of the vehicle body so as to swing, that two window panels, which are a window panel that is mounted on this door and a window panel that is provided separately from the window panel to make up the rear surface of the wheeled vehicle, are disposed so as to be substantially level with each other while extending continuously in the transverse direction, and that the wiper device is provided which can move over those window panels so as to clean and remove water from them. Premising that the wheeled vehicle is configured in the way described above, when it is determined that the sub door is left open, the wiper device is prohibited from operating.

According to the other aspect of the present invention, the control controls the sub door latch device so as to prohibit the opening of the sub door when the wiper device is in operation. This enables the wiper device to be activated to operate only when the tailgate side window panel and the sub door side window panel are level with each other. This can prevent the opening of the sub door when the wiper device is in operation, thereby making it possible to protect the wiper device.

Namely, The wheeled vehicle of the present invention is based on a premise that a door is mounted at a transverse portion of the rear portion of the vehicle body so as to swing, that two window panels, which are a window panel that is mounted on this door and a window panel that is provided separately from the window panel to make up the rear surface of the wheeled vehicle, are disposed so as to be substantially level with each other while extending continuously in the transverse direction, and that the wiper device is provided which can move over those window panels so as to clean and remove water from them. Premising that the wheeled vehicle 10 is configured in the way described above, the sub door is prohibited from being opened when the wiper device is in operation.

Further, in the present invention, the control unit moves the blade to the stop position so as to stop the wiper device when the sub door unlocking device is operated while the wiper device is in operation. Thus, the wiper device can be stopped without operating an operating module of the wiper device.

In addition, it is considered from the fact that the sub door unlocking device is operated that the operator stays near the wiper device. In case the wiper device is kept operating while the operator stays near the wiper device, there are fears that water removed by the wiper device is splashed on the operator. Owing to this, it is desirable that the wiper device is stopped.

Further, in the present invention, the control unit controls the sub door latch device so as to open the sub door when the wiper device stops in the stop position. Even though the sub door unlocking device is operated while the wiper device is kept in operation, the sub door is allowed to be opened without performing an opening operation again. This is desirable since the sub door can be opened through a single operation.

Further, in the present invention, the control unit activates the warning device after the wiper device has stopped its operation and before the sub door is opened. The operator can recognize that the sub door will be opened as a result of the activation of the warning device. In particular, in the event that it takes a long time from the operation of the sub door unlocking device to the opening the sub door, the sub door can be prevented from being opened unintentionally and abruptly.

Further, in the present invention, in the event that the sub door unlocking device is operated again after the wiper device has stopped operation, the control unit executes a control to open the sub door. As a result of the operator being required to operate again the sub door unlocking device after the wiper device has stopped operation, the operator can be prevented from being surprised by an unintentional and abrupt opening of the sub door.

Further, in the present invention, the control unit executes a control to keep the wiper device stopping in the event that the sub door is closed again after the sub door is once opened. It is considered that the operator of the sub door still stays near the sub door immediately after the sub door is closed. In case the wiper device is activated to operate immediately after the sub door is closed, there are fears that water removed by the wiper device is splashed on the operator. The operator is prevented from being splashed on by water removed by the wiper device by keeping the wiper device stopping.

Further, in the present invention, the control unit executes a control to activate the wiper device when the wheeled vehicle is running. If running of the wheeled vehicle has ended, it is considered that there is no person who lies near the wheeled vehicle. Thus, the wiper device can be reactivated to operate without performing a reactivating operation of the wiper device while preventing a person lying on the periphery of the wheeled vehicle from being splashed on by water removed by the wiper device.

Further, in the present invention, the control unit executes a control to resume the operation of the wiper device when the sub door is closed after the sub door is once opened. Thus, the wiper device can be reactivated to operate without performing the reactivating operation of the wiper device.

Further, in the present invention, the control unit executes a control for a warning to be issued after the sub door is closed again and before the wiper device resumes its operation. The operator can recognize that the wiper device will be activated to operate as a result of the warning device being controlled to issue a warning. In particular, in case it takes a long time from the opening of the sub door to the relocking of the sub door, it is considered that the operator of the sub door forgets that the wiper device is on. Even as this occurs, the wiper device can be prevented from being activated to operate unintentionally and abruptly.

DETAILED DESCRIPTION OF EMBODIMENTS

Figure 1:
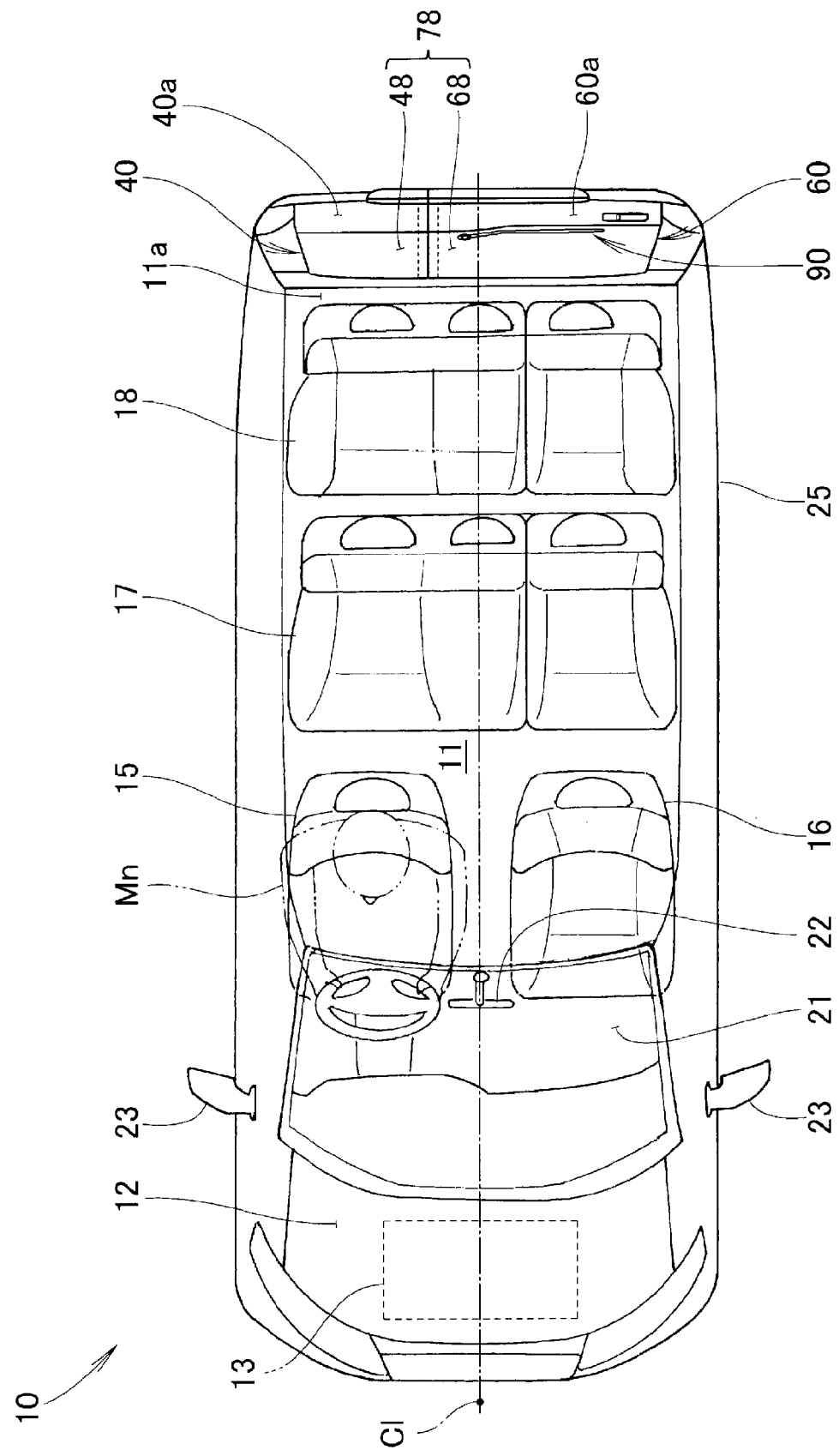
FIG. 1 is a perspective view of a wheeled vehicle according to Embodiment 1 of the present invention as viewed from thereabove.

A mode for carrying out the present invention will be described based on the accompanying drawings. When referred to in the following description, "left" and "right" denote, respectively, the left and right of an occupant of a wheeled vehicle who sits facing forwards, and "front" and "rear" denote, respectively, front and rear in relation to a traveling direction of the wheeled vehicle. In the drawings, Fr denotes front, and Rr denotes rear. L denotes the left of the occupant facing the front, and R denotes the right of the occupant facing the front. Up denotes up, and Dn denotes down.

<Embodiment 1>

A wheeled vehicle according to Embodiment 1 will be described.

FIG. 1 shows a right-hand drive tall station wagon or a van-type passenger vehicle as an example of a wheeled vehicle 10. In the wheeled vehicle 10, an engine compartment 12 is formed at the front of a passenger compartment 11, and an engine 13 as a driving power source is mounted in the engine compartment 12. Three rows of seats in which occupants are seated are provided inside the passenger compartment 11.

A driver's seat 15 is provided on a right hand side of a front portion of the passenger compartment 11, and a front passenger's seat 16 (another seat 16) is provided adjacent to the driver's seat 15. A center line C1 that passes a transverse center to extend in a front-to-rear direction is situated between the driver's seat 15 and the front passenger's seat 16. Namely, the driver's seat 15 is disposed in a position that is offset to the right with respect to the transverse center C1, and the front passenger's seat 16 is disposed in a position that is offset to the left with respect to the transverse center C1. Hereinafter, a right hand side of the wheeled vehicle will be referred to as a "driver's seat side" and a left hand side of the wheeled vehicle will be referred to as a "front passenger's seat side" as required. Namely, in this embodiment, the driver's seat side can be referred to as the right hand side of the wheeled vehicle, and the front passenger's seat side can be referred to as the left hand side of the wheeled vehicle. When looking at the wheeled vehicle 10 from a side thereof, the driver's seat 15 and the front passenger's seat 16 overlap each other, and hence, these front seats will be referred to as a first row seat as a whole as required.

A second row seat 17 in which three occupants can be seated is provided behind the driver's seat 15 and the front passenger's seat 16 (the first row seats 15, 16) so as to extend along a vehicle's width or transverse direction. A third row seat 18 (the rear row seat 18) in which three occupant can be seated is provided behind the second row seat 17 (the middle row seat 17) so as to extend along the transverse direction. The second row seat 17 is configured as a single bench seat by providing two seats continuously in the transverse direction. The two seats that make up the second row seat 17 are each constructed so as to be folded up.

The configuration of the third row seat 18 is similar to that of the second row seat 17, and hence, the detailed description thereof will be omitted here. A luggage compartment 11a where to store luggage is formed at a rear end portion of the passenger compartment 11, that is, a portion behind the third row seat 18.

An inside rearview mirror 22 is mounted at a transverse center of an upper portion of a windshield 21 for an occupant Mn to obtain a rearward view through a backlight. Additionally, outside rearview mirrors 23,23 are mounted at left and right end portion of a front portion of a vehicle body 25 for the occupant to obtain sideward and rearward views. The wheeled vehicle 10 will be described in greater detail based on FIGS. 2 and 3.

Figure 2:
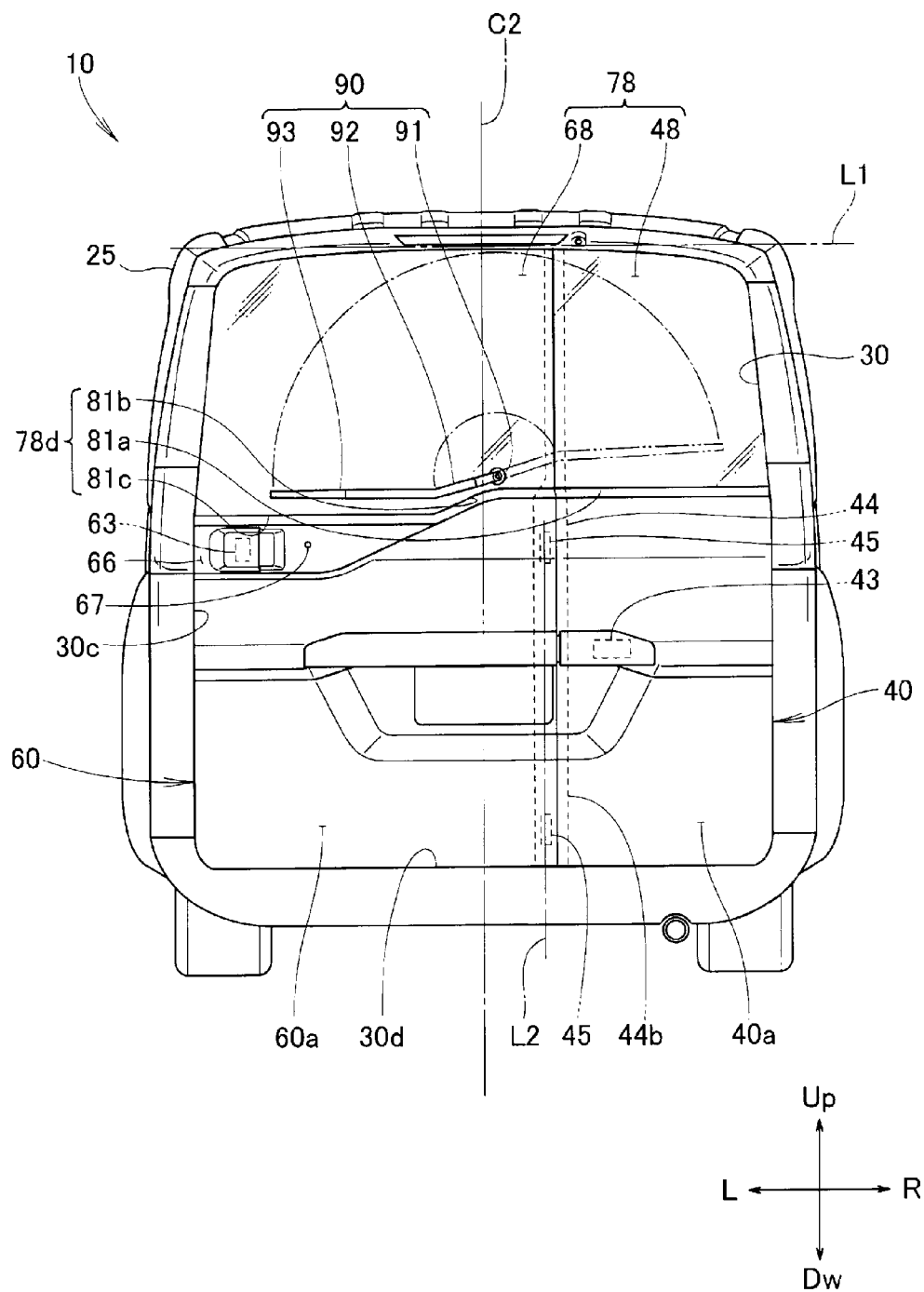
FIG. 2 is a rear view of the wheeled vehicle shown in FIG. 1.
Figure 3:
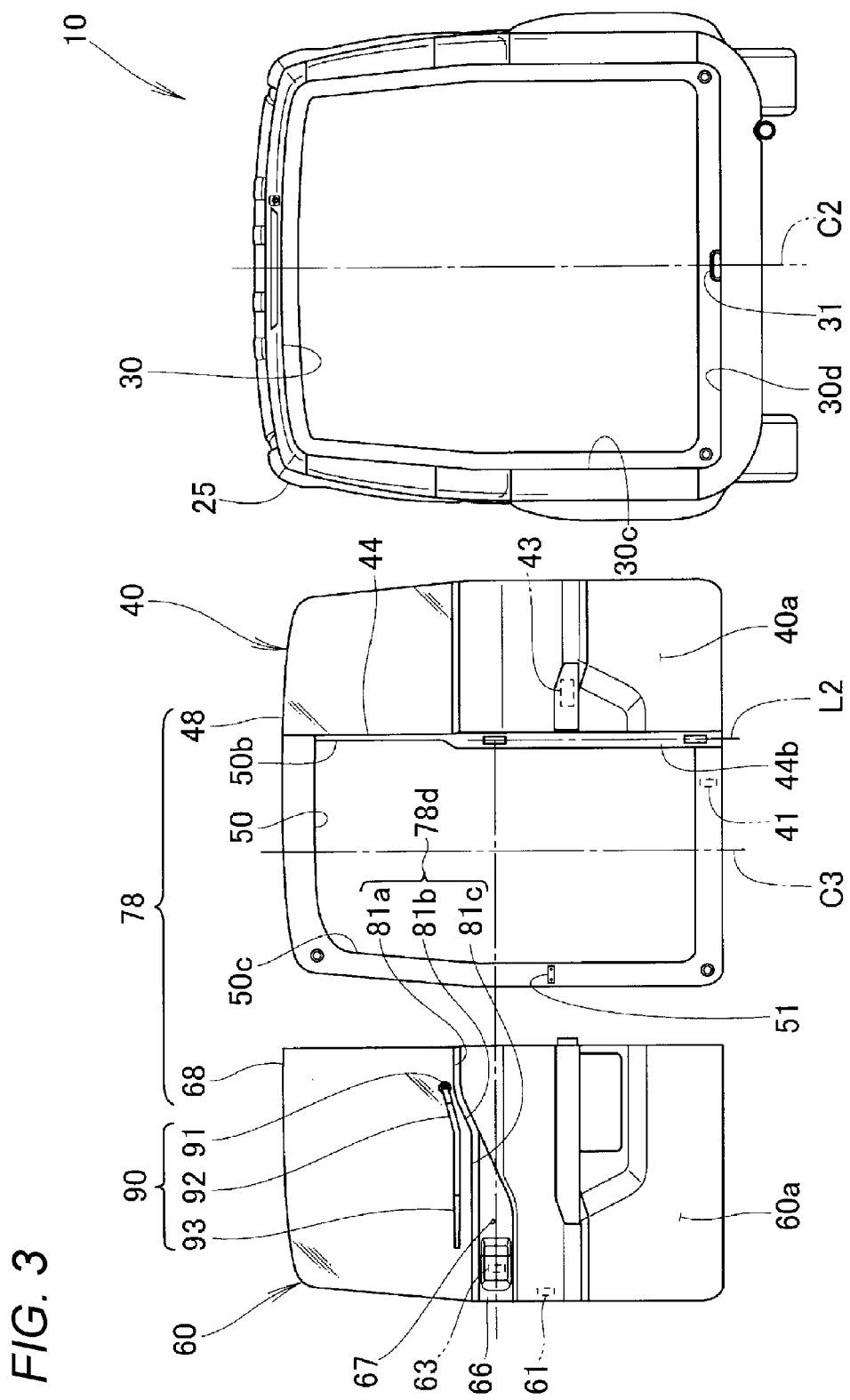
FIG. 3 is an exploded view of the wheeled vehicle shown in FIG. 2.

As shown in FIGS. 2 and 3, a rear opening 30 is formed at a rear end of the vehicle body 25 so as to expand fully along the transverse direction and in a up-to-down or vertical direction. A tailgate 40 is mounted so as to open and close this rear opening portion 30. When in a closed state, part of the tailgate 40 makes up a rear surface of the wheeled vehicle.

A sub door opening 50 (a door opening 50 or an ingress and egress opening 50) is formed in a transverse portion of the tailgate 40 so as to expand fully in a height-wise direction of the tailgate 40. The sub door opening 50 is an opening that is formed for an occupant to get on and off the wheeled vehicle and is formed so as to expand from an end portion of the wheeled vehicle 10 on the front passenger's seat side to a position that lies beyond the transverse center (refer to a center line C2 extending vertically at the transverse center). A sub door 60 (a door 60 or an ingress and egress sub door 60) is mounted in the sub door opening 50 so as to open and close the sub door opening 50. With the tailgate 40 and the sub door 60 both left in a closed state, the sub door 60 makes up part of the rear surface of the wheeled vehicle 10.

Hereinafter, the "center line C2 that extends vertically at the transverse center" will be referred to as a "transverse center C2," as required.

A rear window panel 78 is disposed on the rear surface of the wheeled vehicle 10 so as to expand along the transverse direction. The rear window panel 78 is made up of a tailgate side window panel 48 that is fixed to the tailgate 40 and a sub door side window panel 68 that is fixed to the sub door 60. The tailgate side window panel 48 and the sub door side window panel 68 are provided continuously along the transverse direction. A rear surface of the tailgate side window panel 48 and a rear surface of the sub door side window panel 68 are disposed so as to be substantially level with each other.

Here, the expression of "substantially level" includes a case where the rear surface of the tailgate side window panel 48 and the sub door side window panel 68 are formed continuously and the window panels 48, 68 are both formed into a curved surface.

A wiper device 90 is provided on the rear window panel 78 which cleans and removes water from both the tailgate side window panel 48 and the sub door side window panel 68 by moving thereon as indicated by imaginary lines shown in FIG. 2. This wiper device 90 operates to move over both the tailgate side window panel 48 and the sub door side window panel 68 so as to clean and remove water therefrom. Hereinafter, the "wiper device 90" will be referred to as a "rear wiper 90" as required.

The tailgate 40 is mounded at a rear portion of the vehicle body 25 so as to swing about a first opening and closing axis L1 that extends in a horizontal direction at an upper portion of the vehicle body 25. The tailgate 40 swings up and down in the vertical direction.

An electrically unlocked tailgate latch device 41 (a tailgate lock device 41) is mounted at a lower end of the tailgate 40 for bringing the tailgate 40 into engagement with the vehicle body. The tailgate latch device 41 is a known latch device that is locked (is put in a latched state) by being brought into engagement with a tailgate striker 31 that is mounted at a center of a lower edge 30d of the rear opening 30.

The tailgate latch device 41 is released from the locked state by a tailgate handle 43 that is provided on a rear surface portion 40a of the tailgate 40.

A center line C3 that extends vertically at a transverse center of the sub door opening 50 is offset to the left with respect to the center line C2 that extends vertically at the center of the vehicle. Namely, the center line C3 of the sub door opening 50 is positioned at a portion that is offset to the front passenger's seat side with respect to the center line C2 that extends vertically at the transverse center.

A right edge portion 50b of the sub door opening 50 (a side edge portion on the driver's seat side) is positioned closer to the driver's seat side than the transverse center C2. A pillar 44 that supports the sub door 60 extends in the vertical direction along the right edge portion 50b of the sub door opening 50.

Two hinges 45, 45 that support the sub door 60 so as to rotate in the horizontal direction are mounted on a thick portion 44b of the pillar 44 that is positioned lower than the rear window panel 78.

The sub door 60 is supported on the pillar 44 via the two hinges 45, 45 and is configured as a so-called laterally opening door. An axis that passes a center between the two hinges 45 to extend in a perpendicular direction is referred to as a second opening and closing axis L2, and the sub door 60 swings about this second opening and closing axis L2. The sub door 60 swings in a front-to-rear or longitudinal direction of the vehicle body 25 and in the horizontal direction. As this occurs, the sub door 60 opens from the other end portion (a side of the rear opening 30 that faces a left side edge 30c) that is opposite to the driver's seat side.

An electrically unlocked sub door latch device 61 (a sub door lock device 61) is mounted at a front passenger's seat side end portion of the sub door 60 to bring the sub door 60 into engagement with the vehicle body. The sub door latch device 61 is a known latch device that is locked (is put in a latched state) by being locked by a sub door striker 51 that is mounted on a left side edge 50c of the sub door opening 50.

A handle garnish 66 (a garnish 66) is attached so as to extend from the front passenger's seat side end portion of the sub door 60 towards the transverse center C2. The handle garnish 66 supports a sub door outer handle 63 (a sub door unlocking device 63) by which the sub door 60 is opened.

Although this will be described in detail later, a sub door inner handle (denoted by reference numeral 64 in FIG. 10) by which the sub door 60 is opened is disposed further on an inner side surface portion of the sub door 60. Namely, the two sub door handles, the sub door outer handle 63 and the sub door inner handle, are mounted on the sub door 60.

A lock switch 67 is disposed in the sub door 60 between the sub door outer handle 63 and the tailgate handle 43, and this lock switch 67 is used not only to lock or unlock the tailgate 40 but also to lock or unlock the sub door 60. A single lock switch 67 is disposed.

Here, locking or unlocking the tail gate 40 and the sub door 60 by operating the lock switch 67 makes the tailgate handle 43, the sub door outer handle 63 and the sub door inner handle operable or inoperable. Namely, when the lock switch 67 is operated to lock the tailgate 40, even though the tailgate handle 43 is operated, the tailgate latch device 41 is not activated. On the contrary, when the lock switch 67 is operated to unlock the tailgate 40, the tailgate latch device 41 is activated by operating the tailgate handle 43. This will be true with the sub door latch device.

A known mechanism is adopted as a mechanism of switching between locking and unlocking by depressing the lock switch 67.

A lower side 78d of the rear window panel 78 is made up of a driver's seat side horizontal portion 81a that extends substantially horizontally from a driver's seat side end portion to the transverse center C2, an inclined edge 81b that extends along a downward gradient from the transverse center C2 towards a front passenger's seat side end portion, and a front passenger's seat side horizontal portion 81c (an another seat side horizontal portion 81c) that extends from a lower end of the inclined edge 81b to the front passenger's seat side end portion. By adopting this configuration, in the lower side 78d of the rear window panel 78, the front passenger's seat side deviates further downwards than the driver's seat side.

The driver's seat side horizontal portion 81a of the lower side 78d of the rear window panel 78 is made up of part of a lower side of the sub door side window panel 68 and a lower side of the tailgate side window panel 48. The inclined edge 81b and the front passenger's seat side horizontal portion 81c are made up of the remaining portion of the lower side of the sub door side window panel 68.

The wiper device 90 includes a pivot shaft 91 that is positioned closer to a driver's seat 15 side than the transverse center C2, a wiper arm 92 that extends from the pivot shaft 91 transversely outwards and downwards and a blade 93 that extends transversely outwards in the horizontal direction from a distal end of the wiper arm 92. As shown in FIG. 2, with the wiper device 90 staying at rest, the blade 93 stays stationary above the front passenger's seat side horizontal portion 81c of the rear window panel 78 while extending therealong. This position is referred to as a stationary or stop position.

The wheeled vehicle 10 of the present invention is based on a premise that a door (the sub door 60) is mounted at a transverse portion of the rear portion of the vehicle body 25 so as to swing, that two window panels, which are a window panel (the sub door side window panel 68) that is mounted on this door and a window panel (the tailgate side window panel 48) that is provided separately from the window panel to make up the rear surface of the wheeled vehicle, are disposed so as to be substantially level with each other while extending continuously in the transverse direction, and that the wiper device 90 is provided which can move over those window panels so as to clean and remove water from them. Premising that the wheeled vehicle 10 is configured in the way described above, when it is determined that the door is closed, the wiper device 90 is allowed to operate, while when it is determined that the wiper device 90 stops, the door is allowed to be opened. Hereinafter, this will be described in detail.

Figure 4:
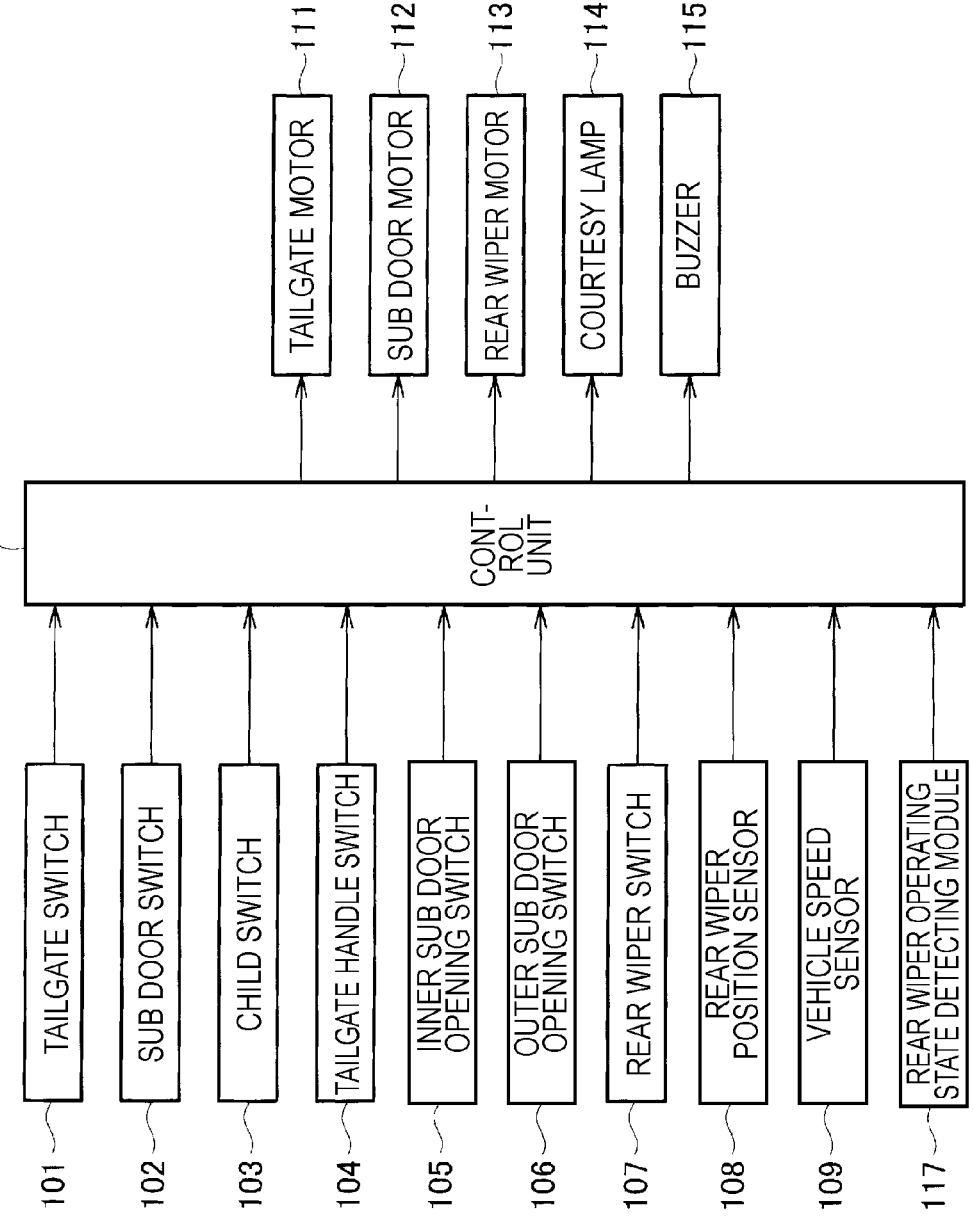
FIG. 4 is a schematic view describing a control system of the wheeled vehicle shown in FIG. 2.

As shown in FIGS. 3 and 4, the wheeled vehicle 10 has a control unit 100 that controls operations of the tailgate 40, the sub door 60 and the rear wiper 90.

This control unit 100 receives detection signals from a tailgate switch 101 (a tailgate detecting module 101) that detects that the tailgate 40 is in a closed state, a sub door switch 102 (a sub door detecting module 102) that detects that the sub door 60 is in a closed state, a child switch 103 that prohibits the sub door 60 from being opened from a passenger compartment side when switched on, a tailgate handle switch 104 that detects that the tailgate handle 43 is operated, an inner sub door opening switch 105 (a sub door unlocking operation detecting module 105) that detects that the sub door inner handle (denoted by reference numeral 64 in FIG. 10) is operated, an outer sub door opening switch 106 (a sub door unlocking operation detecting module 106) that detects that the sub door outer handle 63 is operated, a rear wiper switch 107 (a rear wiper control module 107) that issues an operation command and a stop command to the rear wiper 90, a rear wiper position sensor 108 (a wiper position detecting module 108) that detects that the blade 93 of the rear wiper 90 stays in the stop position, a vehicle speed sensor 109 (a running detecting module 109) that measures a vehicle speed of the wheeled vehicle 10, and a rear wiper operating state detecting module 117 that detects that the rear wiper 90 is in operation.

The rear wiper operating state detecting module 117 detects whether or not the blade is swinging actually, irrespective of whether or not an operation command has been issued to the rear wiper 90. In addition, a single sensor can be used to function as the rear wiper position sensor 108 and the rear wiper operating state detecting module 117.

On the other hand, the control unit 100 controls a tailgate motor 111 that activates the tailgate latch device 41 to operate, a sub door motor 112 that activates the sub door latch device 61 to operate, a rear wiper motor 113 that activates the blade 93 of the rear wiper 90 to swing, a courtesy lamp 114 that illuminates near the sub door 60, and a buzzer 115 (a warning device 115) that emits a warning sound based on the detection signals.

In addition to the buzzer 115 that is a device emitting a warning in an auditory fashion, a device like a lamp that emits a warning in a visual fashion can be adopted as the warning device. Further, both the auditory device and the visual device may be adopted together. Furthermore, the warning device may be mounted not only in the vicinity of the tailgate 40 but also in the vicinity of the driver's seat (for example, as an integral part of the instrumentation). Namely, the warning device can be mounted in an arbitrary location, and hence, where to locate the warning device is not limited to those locations.

Additionally, the switches or sensors that send detection signals to the control unit 100 may adopt devices that make assumptions from separate parameters. Namely, the detecting modules are not limited to the switches or sensors.

Figure 5:
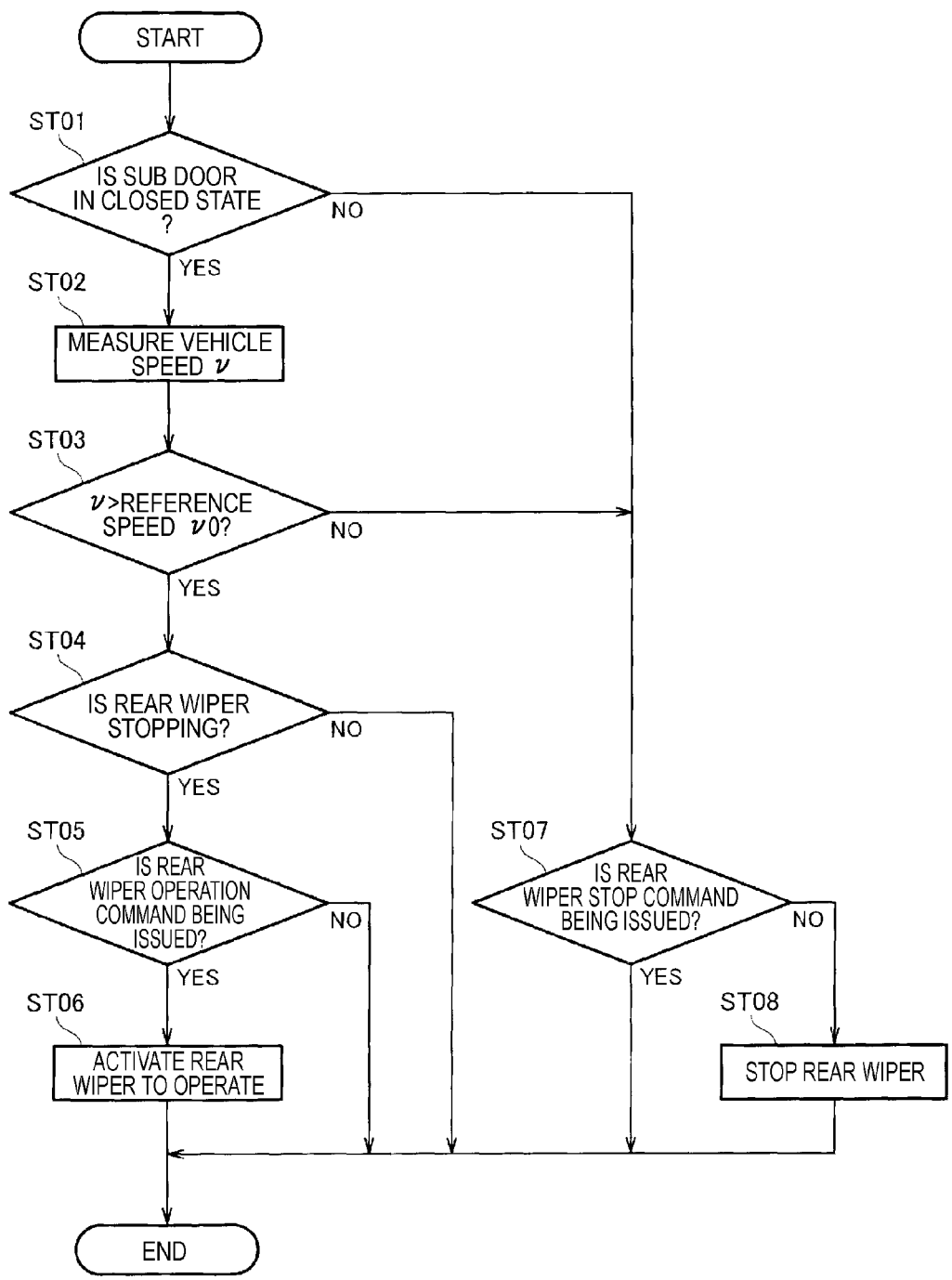
FIG. 5 is a flowchart describing operating conditions of a wiper device shown in FIG. 2.
Figure 8:
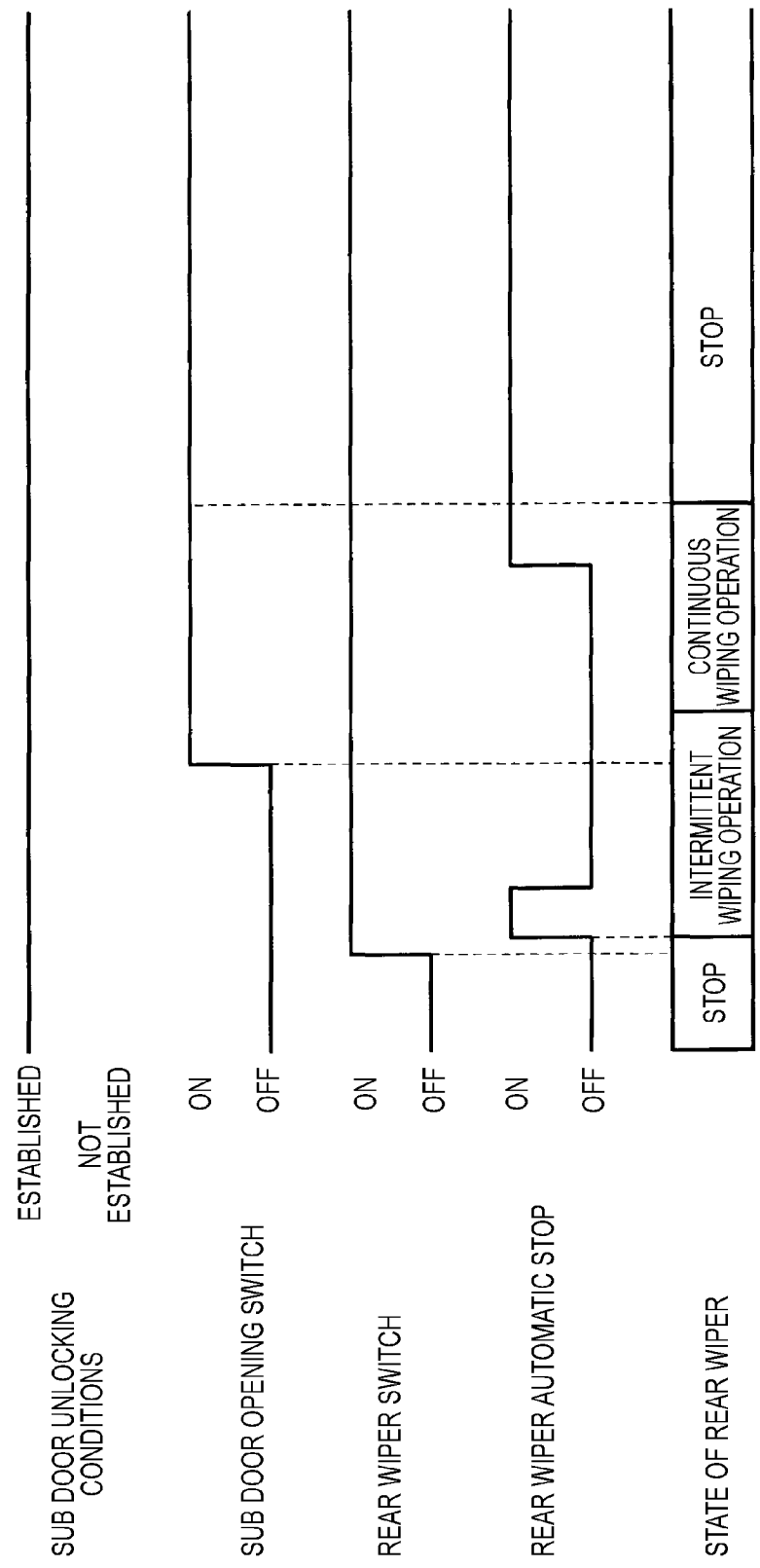
FIG. 8 is a time chart describing operating conditions of the wiper device shown in FIG. 2.

Referring to FIGS. 5 and 8, too, conditions will be described under which the rear wiper 90 is activated to operate. Firstly, the control unit 100 determines whether or not the sub door 60 is in a closed state based on the detection signal from the sub door switch 102 (step 01. Hereinafter, "step" will be written as "ST."). The sub door switch 102 detects that the sub door 60 is in the closed state when the sub door latch device 61 is in a fully latched state and in a half latched state.

If the sub door 60 is in the closed state, a vehicle speed v is measured by the vehicle speed sensor 109 (ST02), and the control unit 100 determines whether or not the vehicle speed v is faster than a reference speed v0 (ST03). If it determines that the vehicle speed v is faster than the reference speed v0, the control unit 100 determines whether or not the rear wiper 90 stops based on the detection signal from the rear wiper operating state detecting module 117 (ST04). If it determines that the rear wiper 90 stops, the control unit 100 determines whether or not an operation command has been issued to the rear wiper 90 based on the detection signal from rear wiper switch 107 (ST05).

If it determines that the operation command has been issued to the rear wiper and that the rear wiper stops, the control unit 100 controls the rear wiper motor 113 to activate the rear wiper 90 to operate (ST06) and then ends the control. If a stop command has been issued to the rear wiper 90, the control unit 100 keeps the rear wiper 90 stopping. If it determines in ST04 that the rear wiper 90 does not stop, that is, if the rear wiper 90 is in operation, the control unit 100 ends the control then.

Namely, if it is determined that the sub door 60 is closed and that the vehicle speed is faster than the predetermined speed, the rear wiper 90 can be activated to operate (again).

If the control unit 100 determines in ST03 that the vehicle speed v is equal to or slower than the reference speed v0, the control unit 100 ends the control then. Namely, if the rear wiper 90 is stopped in ST32, the control unit 100 keeps the rear wiper 90 stopping. Here, when the rear wiper switch 107 is switched off (a stop command) once and then is switched on (an operation command) again, the rear wiper 90 may be activated to operate as instructed by the command. By doing so, when the user intends to resume the wiping operation, the operation of the wiper can be resumed.

If it determines in ST01 that the sub door 60 is left open, the control unit 100 determines based on the detection signal from the rear wiper switch 107 whether or not a stop command has been issued to the rear wiper 90 (ST07).

Figure 6:
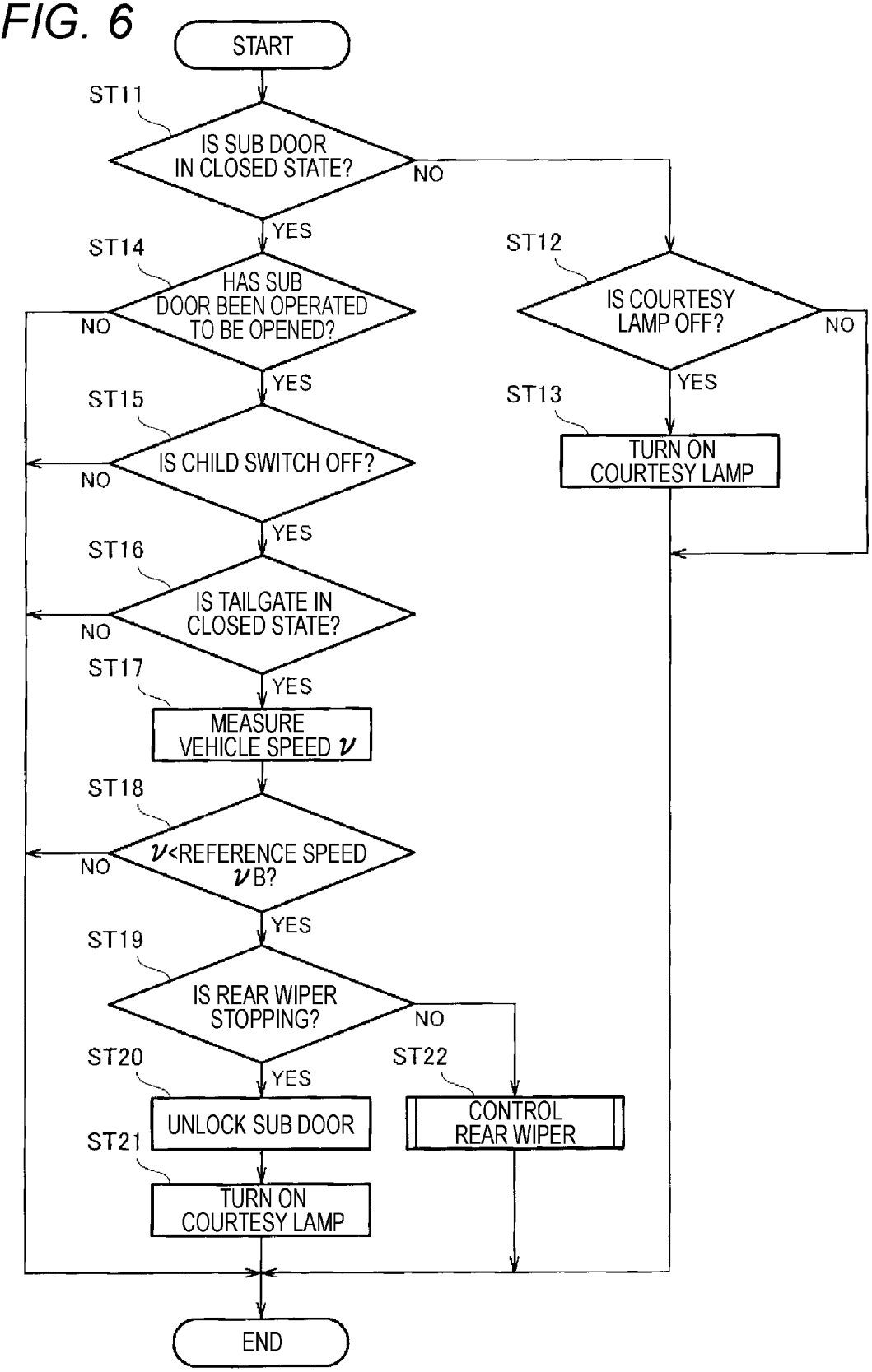
FIG. 6 is a flowchart describing opening conditions of a sub door shown in FIG. 2.
Figure 7:
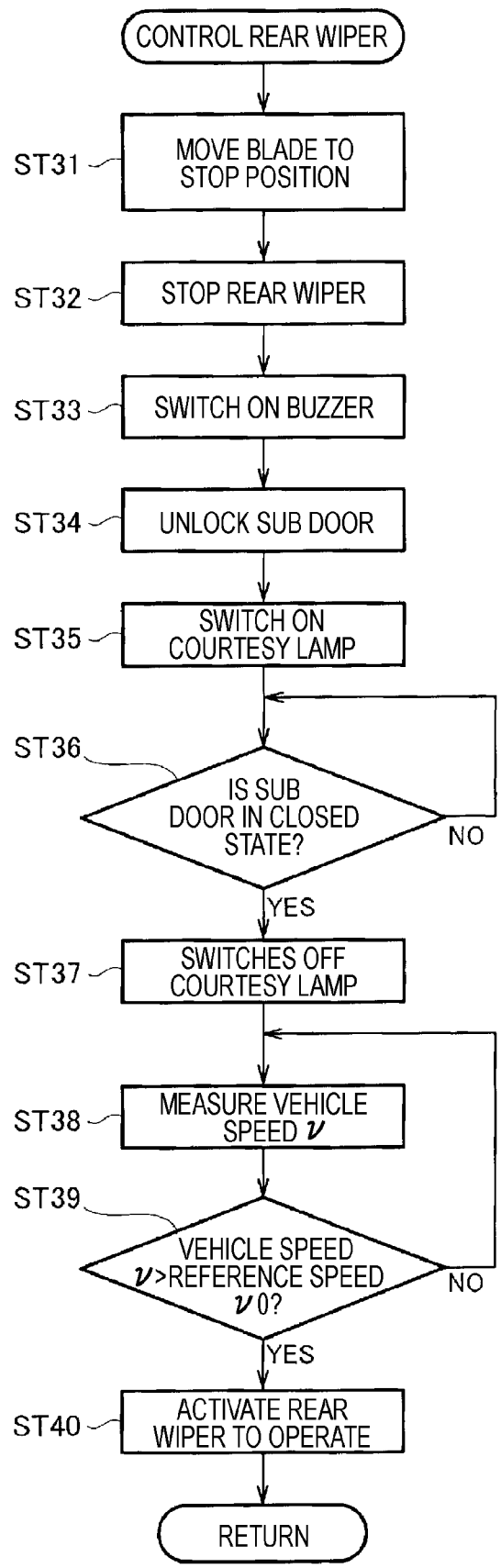
FIG. 7 is a flowchart describing the opening of the sub door with the wiper device kept operating when the sub door is operated to be opened as shown in FIG. 2.

If the control unit 100 determines that the stop command has been issued to the rear wiper 90, from flowcharts shown in FIGS. 6 and 7, with the sub door 60 left open, the control unit 100 ends the control then, since it is sure that the rear wiper 90 stops. If the control unit 100 determines that the operation command has been issued to the rear wiper 90, the control unit 100 controls the rear wiper motor 113 so as to stop the rear wiper 90 (to prohibit the operation of the rear wiper 90) (ST08) and ends the control.

Namely, if it determines that the sub door 60 is left open, the control unit 100 prohibits the operation of the rear wiper 90. Owing to this, the wiper device 90 can be activated to operate only when the tailgate side window panel 48 and the sub door side window panel 68 are substantially level with each other. Thus, the wiper device 90 can be prevented from being activated to operate when a different in level is caused between the window panels 48, 68, thereby making it possible to protect the wiper device 90.

Based on FIGS. 3, 4 and 6, a case where the sub door 60 is opened will be described. Firstly, the control unit 100 determines whether or not the sub door 60 is closed based on the detection signal from the sub door switch 102 (ST11).

If the sub door 60 is not closed, namely, if the sub door 60 is left open, the control unit 100 determines whether or not the courtesy lamp 114 is turned off (ST12). If it determines that the courtesy lamp 114 is turned off, the control unit 100 turns on the courtesy lamp 114 (ST13) and ends the control then. On the other hand, if it determines that the courtesy lamp 114 is turned on, the control unit 100 ends the control then.

If it determines in ST11 that the sub door 60 is closed, the control unit 100 determines whether or not the sub door 60 is operated to be opened based on the detection signal from the inner or outer sub door opening switch 105, 106 (ST14).

If it determines that the inner or outer sub door opening switch 105, 106 has been operated, the control unit 100 determines whether or not the child switch 103 is switched off based on the detection signal from the child switch 103 (ST15).

If it determines that the child switch 103 is off, the control unit 100 determines whether or not the tailgate 40 is closed based on the detection signal from the tailgate switch 101 (ST16). If it determines that the tailgate 40 is closed, the control unit 100 measures a vehicle speed v by the use of the vehicle speed sensor 109 (ST17) and determines whether or not the vehicle speed v is slower than a reference speed vb (ST18).

If it determines that the vehicle speed v is slower than the reference speed vb, the control unit 100 determines whether or not the rear wiper 90 stops based on the detection signal from the rear wiper operating state detecting module 117 (ST19). If it determines that the rear wiper 90 stops, the control unit 100 controls the sub door motor 112 so as to open the sub door 60 (ST20).

This releases the locking of the sub door latch device 61 on the sub door striker 51, whereby the sub door 60 is opened. The control unit 100 turns on the courtesy lamp 114 (ST21) to be ended.

Namely, the sub door 60 is opened if the control unit 100 determines that the sub door outer handle 63 or the sub door inner handle is operated, that the child switch 103 is switched off, the tailgate 40 is closed, that the vehicle speed is faster than the predetermined speed and that the rear wiper 90 stops.

If it is determined in ST14 that the sub door outer handle 63 or the sub door inner handle is not operated, if it is determined in ST15 that the child switch 103 is on, if it is determined in ST16 that the tailgate 40 is opened, or if it is determined in ST18 that the vehicle speed v is equal to or faster than the reference speed vb, the control unit 100 ends the control then. Namely, the control unit 100 prohibits the sub door 60 from being opened in anyone of those conditions.

If it determines in ST19 that the rear wiper 90 is in operation, the control unit 100 controls the rear wiper 90 as will be described in FIG. 7 (ST22).

The control of the rear wiper will be described based on FIGS. 3, 4 and 7. When the rear wiper 90 is in operation, the control unit 100 controls the rear wiper motor 113 so as to move the blade 93 of the rear wiper 90 to the stop position (ST31).

When the blade 93 of the rear wiper 90 has moved to the stop position, the control unit 100 controls the rear wiper motor 113 so as to stop its operation to thereby stop the rear wiper 90 (ST32). Whether or not the blade 93 stays in the stop position is determined by the detection signal from the rear wiper position sensor 108.

If the rear wiper 90 stops, the control unit 100 switches on the buzzer 115 (ST33) and unlocks the sub door 60 (releases the sub door 60 from the latched state) (ST34). This allows the sub door 60 to be opened. If the sub door 60 is opened, the control unit 100 switches on the courtesy lamp 114 (ST35). Namely, the courtesy lamp 114 is illuminated.

If the sub door 60 is closed again (ST36), the control unit 100 switches off the courtesy lamp 114 (ST37). Then, a vehicle speed v is measured by the vehicle speed sensor 109 (ST38). The control unit 100 determines whether or not the vehicle speed v is faster than the reference speed V0 (ST39). If it determines that the vehicle speed v is faster than the reference speed v0, the control unit 100 controls the rear wiper motor 113 so as to activate the rear wiper 90 to operate (ST40) and ends the control then.

If the vehicle speed v is equal to or slower than the reference speed v0, a vehicle speed v is measured again (ST38). Namely, when the sub door 60 is closed after the sub door 60 is opened and the wheeled vehicle 10 starts to run again, the rear wiper 90 is activated to operate again. As this occurs, the rear wiper device 90 does not have to be operated. Further, the rear wiper 90 is kept stopping until the vehicle speed v exceeds the reference speed v0 after the wheeled vehicle 10 starts to run again.

If an operating module of the rear wiper device 90 is has been switched off until the wheeled vehicle 10 starts to run again, the rear wiper device 90 is not activated. In this case, the control unit 100 moves the blade 93 to the stop position after the wheeled vehicle 10 has started to run and then stops the rear wiper device 90.

Returning to FIGS. 3, 4 and 6, as has been described above, the control unit 100 controls the sub door latch device 61 (the sub door motor 112) so as to prohibit the opening of the sub door 60 when the rear wiper 90 is in operation. Owing to this, the wiper device 90 can be activated to operate only when the tailgate side window panel 48 and the sub door side window panel 68 are substantially level with each other. Thus, the sub door 60 can be prevented from being opened while the wiper device 90 is in operation, thereby making it possible to protect the wiper device 90.

Referring to FIG. 7, too, if the control unit 100 determines that the sub door outer handle 63 or the sub door inner handle (denoted by reference numeral 64 in FIG. 10) is operated while the rear wiper 90 is in operation, the control unit 100 moves the blade 93 to the stop position and then stops the rear wiper 90. Thus, the rear wiper 90 can be stopped without operating the operating module of the rear wiper 90 to stop it.

In addition, it is considered from the fact that the sub door outer handle 63 or the sub door inner handle is operated that the operator stays near the wiper device 90. In the event that the wiper device 90 is kept operating in such a state that the operator stays near the wiper device 90, there are fears that water removed by the wiper device 90 is splashed on the operator. Owing to this, it is desirable to stop the wiper device 90.

Further, the control unit 100 activates the buzzer 115 after the wiper device 90 is stopped and before it executes a control to open the sub door 60. The operator can recognize that the sub door 60 will be opened by the activation of the buzzer 115. In particular, this can prevent the sub door 60 being opened abruptly when it takes a long time from the operation of the sub door outer handle 63 or the sub door inner handle to the opening of the sub door 60.

In addition, if it determines that the wiper device 90 stops in the stop position, the control unit 100 controls the sub door motor 112 (the sub door latch device 61) so as to open the sub door 60. Even though the sub door outer handle 63 or the sub door inner handle is operated while the wiper device 90 is in operation, the sub door 60 is opened without performing an opening operation again. This is desirable since the sub door 60 can be opened through a single operation.

Further, if the control unit 100 determines that the sub door 60 is closed again after the sub door 60 is once opened, the control unit 100 executes a control to keep the wiper device 90 stopping. It is considered that the operator of the sub door 60 stays near the sub door 60 immediately after the sub door 60 is closed. In case the wiper device 90 is activated to operate immediately after the sub door 60 is closed, there are fears that water removed by the wiper device 90 is splashed on the operator. By keeping the wiper device 90 stopping, the operator is prevented from being splashed on by the water so removed.

In addition, if the control unit 100 determines that the wheeled vehicle 10 is running, the control unit 100 executes a control to activate the wiper device 90 to operate. It is considered that there stays no person near the wheeled vehicle 10 after the wheeled vehicle 10 has started to run. The wiper device 90 can be activated to operate again without performing an activating operation of the wiper device 90 while preventing persons staying near the wiper device 90 from being splashed on by water removed by the wiper device 90.

The function of the wheeled vehicle 10 will be described in FIGS. 9 and 10.

Figure 9:
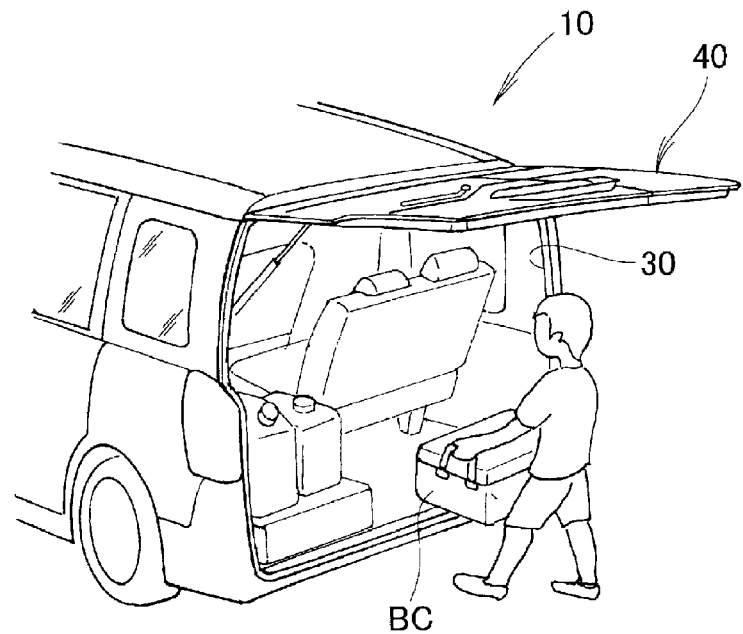
FIG. 9 is a view describing a state in which a tailgate shown in FIG. 2 is left open.

As shown in FIG. 9, when loading a large piece of luggage BC in the wheeled vehicle 10, the tailgate 40 is swung upwards. Since the rear opening 30 is opened to a full extent of the rear surface of the wheeled vehicle 10, the large piece of luggage BC can easily be loaded in the wheeled vehicle 10.

Figure 10:
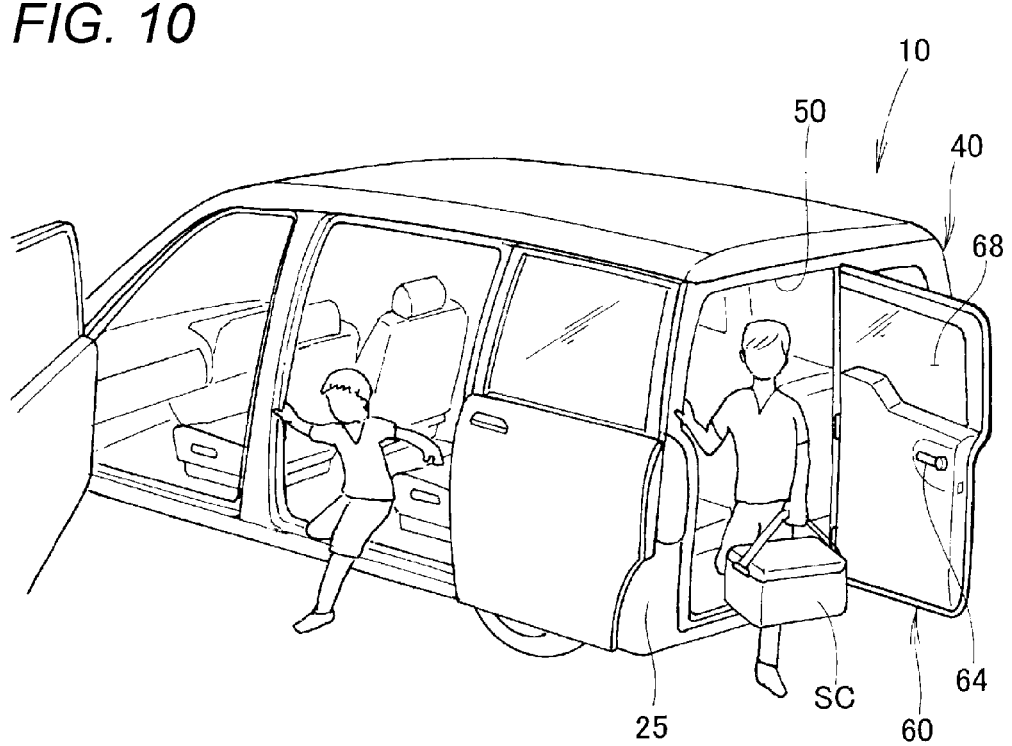
FIG. 10 is a view describing a state in which the sub door shown in FIG. 2 is left open.

As shown in FIG. 10, the sub door opening 50 is opened in the transverse portion of the tailgate 40 and expands substantially to a full extent in relation to the height-wise direction. The occupant can get on or off from the rear portion of the wheeled vehicle 10 by using the sub door opening 50.

In particular, the sub door inner handle 64 (the sub door unlocking device 64) that can release the sub door latch device (denoted by reference numeral 61 in FIG. 3) is provided on an inner surface of the sub door 60. The sub door inner handle 64 is disposed at an opening end side of the sub door 60. Providing the sub door inner handle 64 enables the sub door 60 to be opened and closed by operating the sub door inner handle 64 from the inside of the passenger compartment, whereby the occupant can get off through the rear portion of the vehicle body 25. Namely, allowing the occupant to get on and off the wheeled vehicle also from the inside of the passenger compartment enhances the ease with which the occupant gets on and off the wheeled vehicle.

Additionally, when loading a small piece of luggage SC in the wheeled vehicle 10, the sub door 60 is swung in the horizontal direction. The sub door 60 starts opening from a side edge 50c on a transverse end portion side of the sub door opening 50. Since the sub door 60 makes up part of the tailgate 40, the sub door 60 is lighter in weight than the tailgate 40. Since the sub door 60 is lighter than the tailgate 40, it is easy to open and close the sub door 60, providing a superior operability.

<Embodiment 2>

Next, Embodiment 2 of the present invention will be described based on the drawings.

Figure 11:
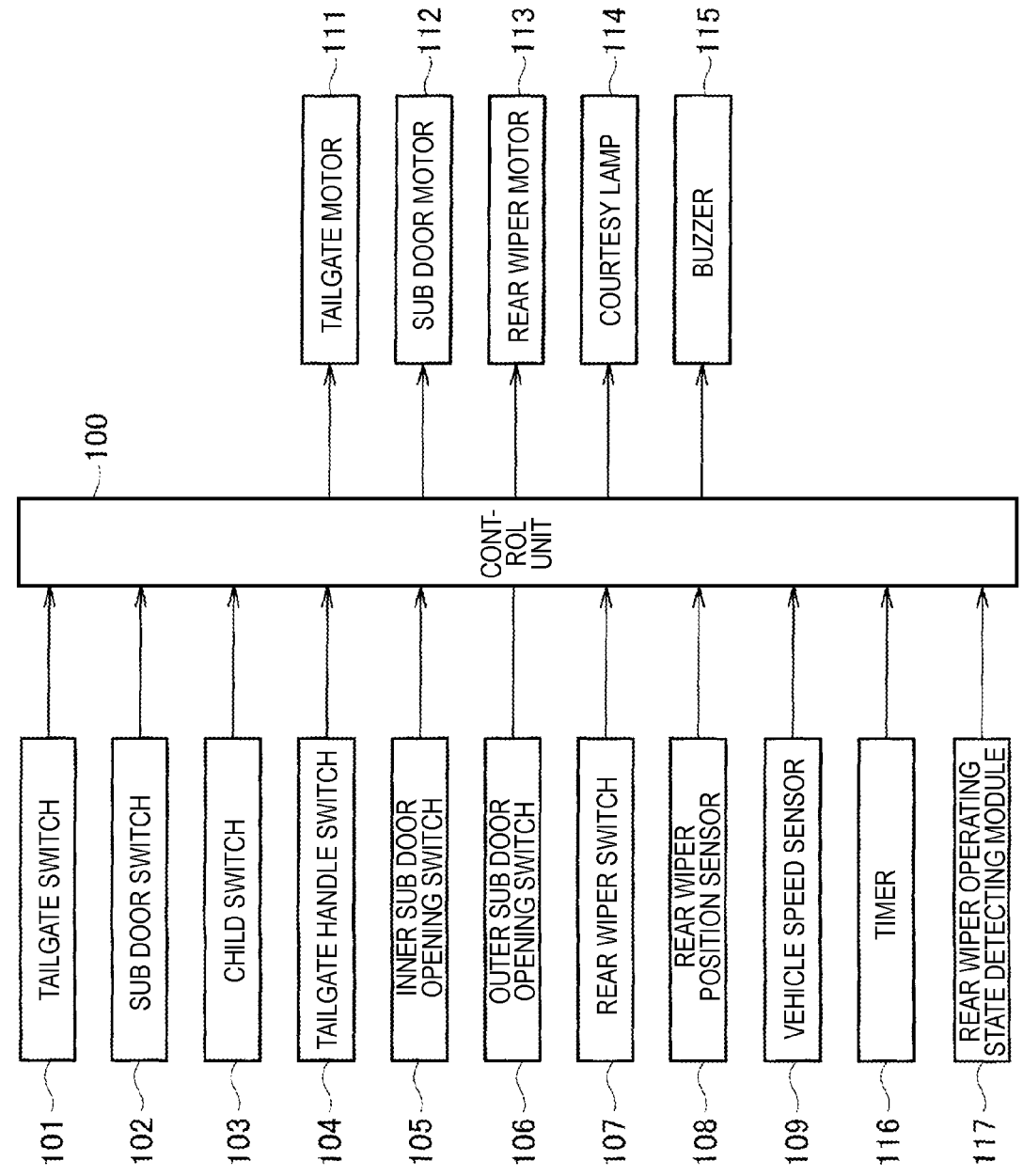
FIG. 11 is a schematic view describing a control system of a wheeled vehicle according to Embodiment 2 of the present invention.

FIG. 11 shows a schematic diagram of a control system of Embodiment 2, which corresponds to FIG. 4. In the control system of Embodiment 2, a timer 116 is added to the control system of Embodiment 1. The timer 116 measures whether or not a predetermined length of time t0 has elapsed since start. The other configurations of Embodiment 2 are similar to those of Embodiment 1, and hence, like reference numerals will be given to like constituent parts, and the detailed description thereof will be omitted here.

Figure 12:
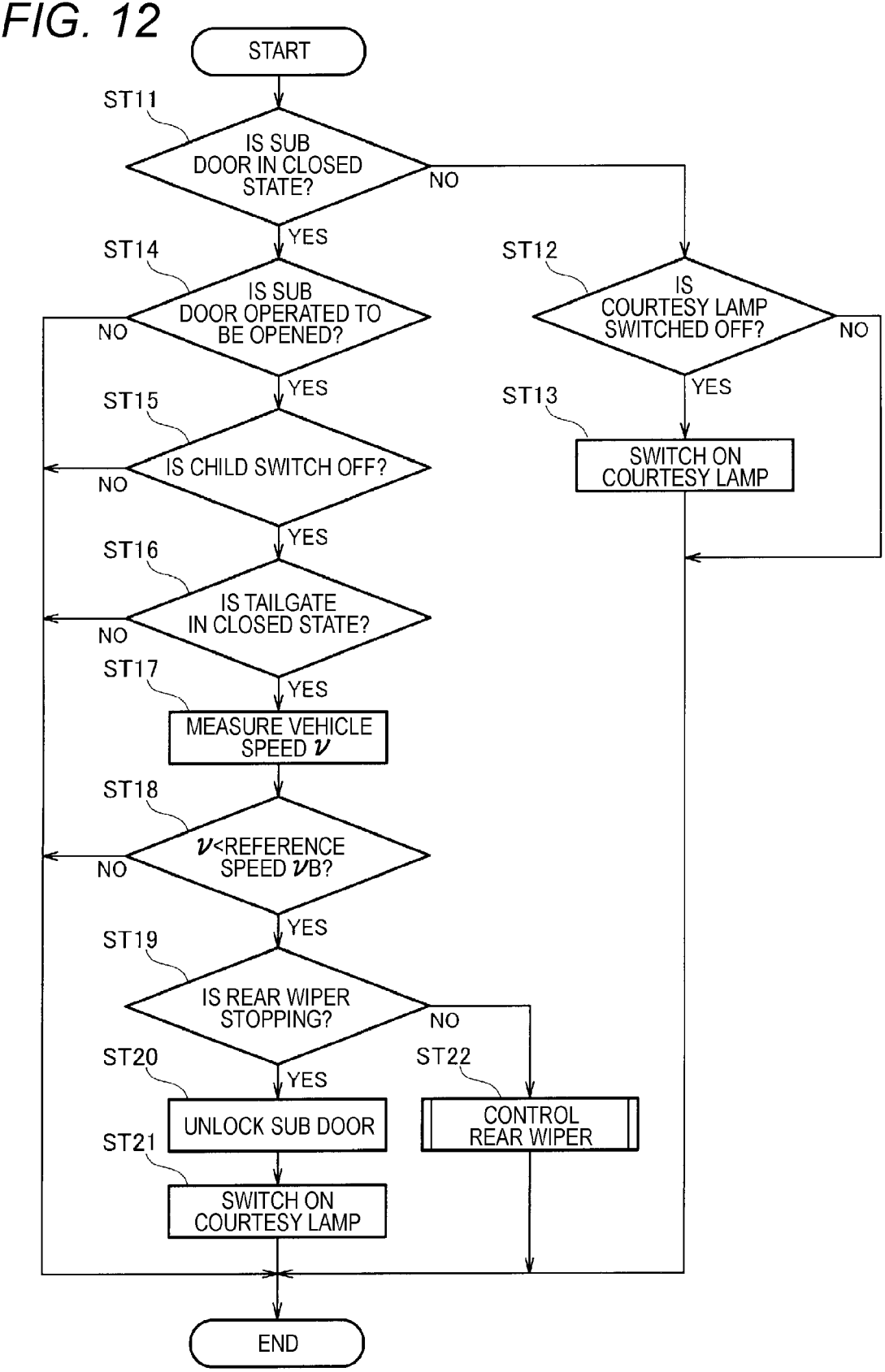
FIG. 12 is a flowchart describing opening conditions of a sub door of the wheeled vehicle according to Embodiment 2.

FIG. 12 shows a flowchart showing a flow of operations until a sub door is opened. The contents thereof are similar to those described in FIG. 6, and hence, the detailed description thereof will be omitted here. If it determines in ST19 that the rear wiper (denoted by reference numeral 90 in FIG. 3) is in operation, the control unit 100 controls the rear wiper (ST22) as described in FIG. 13.

Figure 13:
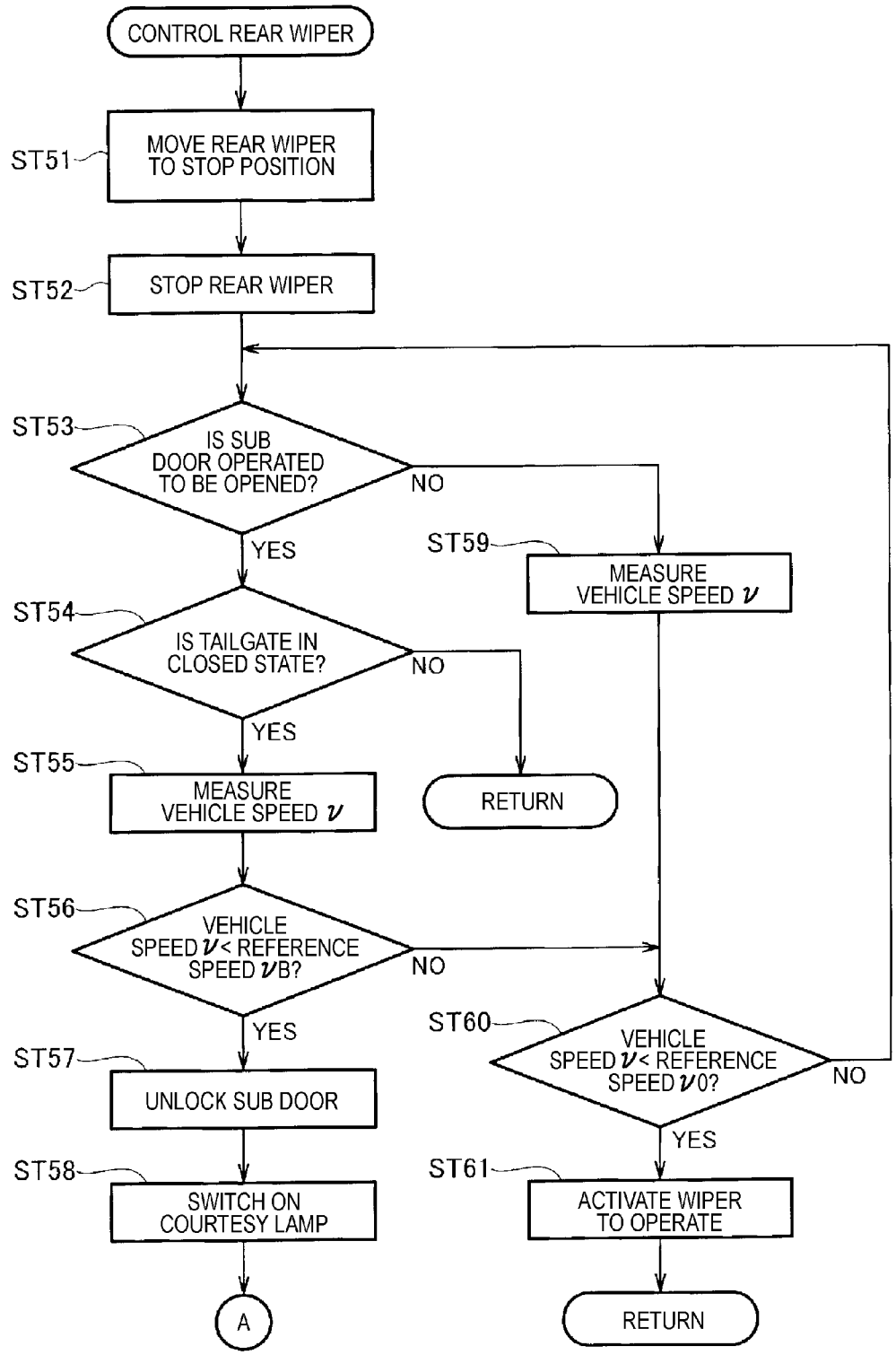
FIG. 13 is a flowchart describing the opening of the sub door with a wiper device kept operating when the sub door is operated to be opened, according to Embodiment 2.

The control of the rear wiper 90 will be described based on FIGS. 3, 11 and 13. If it determines that the rear wiper 90 is in operation, the control unit 100 controls the rear wiper motor 113 to move the blade 93 of the rear wiper 90 to the stop position (ST51).

If the blade 93 of the rear wiper 90 moves to the stop position, the control unit 100 controls the rear wiper motor 113 to stop to thereby stop the rear wiper 90 (ST52). The control unit 100 determines whether or not the blade 93 stays in the stop position based on the detection signal from the rear wiper position sensor 108.

If it determines that the rear wiper 90 stops, the control unit 100 determines whether or not the sub door 60 is operated to be opened based on the detection signal from the inner or outer sub door opening switch 105, 106 (ST53).

If it determines that the sub door 60 is operated to be opened, the control unit 100 determines whether or not the tailgate 40 is closed based on the detection signal from the tailgate switch 101 (ST54). If it determines that the tailgate is left open, the control unit 100 ends the control then. On the other hand, if it determines that the tailgate 40 is closed, the control unit 100 causes the vehicle speed sensor 109 to measure a vehicle speed v (ST55) and then determines whether or not the vehicle speed v is slower than a reference speed vb (ST56).

If it determines that the vehicle speed v is slower than the reference speed vb, the control unit 100 controls the sub door motor 112 so as to unlock the sub door 60 (releases the sub door 60 from the latched state) (ST57). This releases the locking of a sub door latch device 61 on a sub door striker 51, whereby the sub door 60 is opened. The control unit 100 turns on a courtesy lamp 114 (ST58).

If it determines in ST53 that the sub door 60 is not operated to be opened, the control unit 100 causes the vehicle speed sensor 109 to measure a vehicle speed v (ST59) and then determines if the vehicle speed v is faster than a reference speed v0 (ST60). In addition, if it determines in ST56 that the vehicle speed v is equal to or faster than the reference speed vb, the control unit 100 determines whether or not the vehicle speed v is faster than the reference speed v0 (ST60).

If it determines that the vehicle speed v is faster than the reference speed v0, the control unit 100 controls the rear wiper motor 113 so as to activate the rear wiper 90 to operate (ST61) and then ends the control. If it determines that the vehicle speed v is equal to or slower than the reference speed v0, the control unit 100 returns to ST53. Operations after the courtesy lamp 114 is switched on in ST58 will be described based on FIG. 14.

A flow of control operations when the sub door 60 is closed again after the sub door 60 is once opened will be described based on FIGS. 3, 11 and 14. If the sub door 60 is closed again (ST71), the control unit 100 switches off the courtesy lamp 114 (ST72) and starts the timer 116 (ST73).

Then, when a reference time t0 has elapsed (ST74), the control unit 100 switches on a buzzer 116 (ST75), activates the rear wiper 90 to operate (ST76) and stops the timer 116 (ST77). The timer 116 is reset at the point in time when the timer 116 is stopped, and the control unit 100 ends the control then.

Returning to FIGS. 3, 11 and 13, as has been described above, if it determines that the sub door outer handle 63 or the sub door inner handle (denoted by reference numeral 64 in FIG. 10) is operated again after the rear wiper 90 has stopped, the control unit 100 executes a control to open the sub door 60. As a result of the operator being required to operate again the sub door outer handle 63 or the sub door inner handle after the rear wiper 90 has stopped, the operator can be prevented from being surprised by an unintentional and abrupt opening of the sub door 60.

Figure 14:
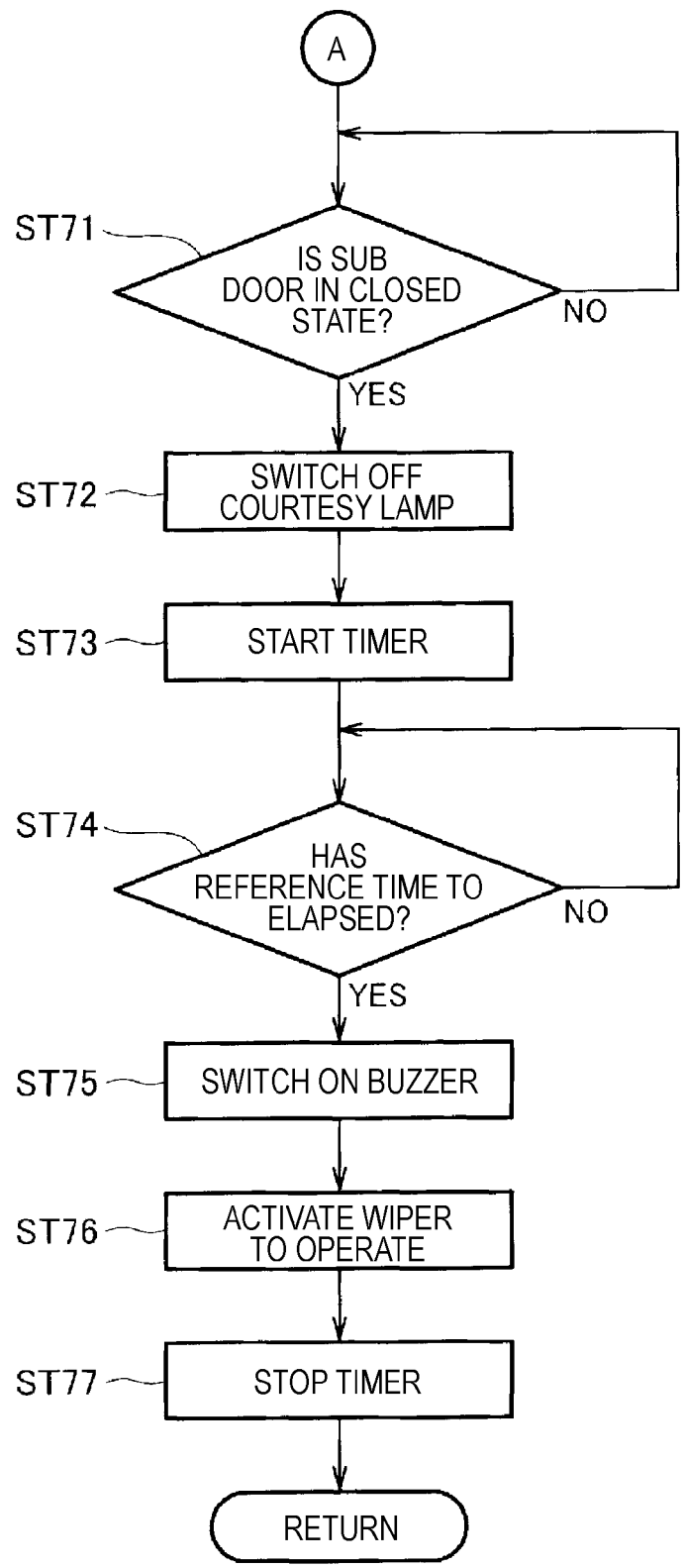
FIG. 14 is a flowchart describing a reoperation of the wiper device after the sub door of the wheeled vehicle according to Embodiment 2 is operated to be closed.

Also, referring to FIG. 14, if it determines that the sub door 60 is closed after the sub door 60 is once opened, the control unit 100 resumes the operation of the rear wiper 90. The rear wiper 90 can be activated to operate again without performing a reactivating operation of the rear wiper 90.

Further, the control unit 100 executes a control to issue a warning after the sub door 60 is closed again and before the operation of the rear wiper 90 is resumed. As a result of the buzzer 115 being activated, the operator can recognize that the rear wiper 90 will be activated to operate. In particular, in case it takes a long time from the opening of the sub door 60 to the reclosing thereof, it is considered that the operator of the sub door 60 forgets that the rear wiper 90 is on. Even as this occurs, the rear wiper 90 can be prevented from being activated to operate unintentionally and abruptly.

In the embodiments, the right-hand drive tall station wagon or van-type passenger vehicle is described as being the wheeled vehicle of the present invention, however, the present invention can also be applied to a left-hand drive tall station wagon or van-type passenger vehicle, as well as a bus other than the tall station wagons or van-type passenger vehicles. Namely, the embodiments that have been described are only the examples of the present invention, and the present invention is not limited to those types of vehicles as long as the functions and advantages described herein can be provided.

INDUSTRIAL APPLICABILITY

The wheeled vehicle of the present invention is preferable for use for a tall station wagon or van-type passenger vehicle.

DESCRIPTION OF REFERENCE NUMERALS 10 wheeled vehicle with tailgate; 25 vehicle body; 30 rear opening; 40 tailgate; 48 tailgate side window panel; 50 sub door opening; 60 sub door; 61 sub door latch device; 63 sub door outer handle (sub door unlocking device); 64 sub door inner handle (sub door unlocking device); 68 sub door side window panel; 90 wiper device; 100 control unit; 115 buzzer (warning device)

The invention claimed is:

1. A wheeled vehicle in which a rear opening is formed in a rear surface of a vehicle body, a tailgate is provided to open and close the rear opening, a sub door opening is formed in a transverse portion of the tailgate, and a sub door is provided to open and close the sub door opening, comprising:
   a tailgate side window panel configured to be provided on the tailgate;
   a sub door side window panel configured to be provided on the sub door;
   a wiper device configured to move over the individual window panels so as to clean and remove water therefrom;
   a sub door latch device configured to engage the vehicle body with the sub door;
   a sub door unlocking device that operates the sub door latch device; and
   a control unit configured to control the sub door latch device,
   wherein the tailgate side window panel and the sub door side window panel are successively disposed with each other in a substantially same plane in a transverse direction, and
   wherein when the wiper device is operating and the sub door unlocking device is operated, the control unit stops the wiper device after moving a blade of the wiper device to a stop position.

2. The wheeled vehicle according to claim 1,
   wherein the control unit controls the sub door latch device so as to open the sub door when the wiper device stops in the stop position.

3. The wheeled vehicle according to claim 2, further comprising:
   a warning device configured to issue a warning, and
   wherein the control unit executes a control to activate the warning device after the wiper device is stopped and before the control unit executes a control to open the sub door.

4. The wheeled vehicle according to claim 3,
   wherein the control unit executes a control to keep the wiper device stopping when the sub door is closed after the sub door is opened.

5. The wheeled vehicle according to claim 4,
   wherein the control unit executes a control to activate the wiper device when the wheeled vehicle is running.

6. The wheeled vehicle according to claim 3,
   wherein the control unit resumes an operation of the wiper device when the sub door is closed again after the sub door is opened.

7. The wheeled vehicle according to claim 6, further comprising:
   a warning device configured to issues a warning, and
   wherein the control unit controls the warning device so as to issue a warning before the operation of the wiper device is resumed after the sub door is closed again.

8. The wheeled vehicle according to claim 2,
   wherein the control unit executes a control to keep the wiper device stopping when the sub door is closed after the sub door is opened.

9. The wheeled vehicle according to claim 8,
   wherein the control unit executes a control to activate the wiper device when the wheeled vehicle is running.

10. The wheeled vehicle according to claim 2,
    wherein the control unit resumes an operation of the wiper device when the sub door is closed again after the sub door is opened.

11. The wheeled vehicle according to claim 10, further comprising:
    a warning device configured to issues a warning, and
    wherein the control unit controls the warning device so as to issue a warning before the operation of the wiper device is resumed after the sub door is closed again.

12. The wheeled vehicle according to claim 1,
wherein the control unit controls the sub door latch device so as to open the sub door when the sub door unlocking device is operated again after the wiper device has stopped.

13. The wheeled vehicle according to claim 12,
wherein the control unit executes a control to keep the wiper device stopping when the sub door is closed after the sub door is opened.

14. The wheeled vehicle according to claim 13,
wherein the control unit executes a control to activate the wiper device when the wheeled vehicle is running.

15. The wheeled vehicle according to claim 12,
wherein the control unit resumes an operation of the wiper device when the sub door is closed again after the sub door is opened.

16. The wheeled vehicle according to claim 15, further comprising:
a warning device configured to issues a warning, and
wherein the control unit controls the warning device so as to issue a warning before the operation of the wiper device is resumed after the sub door is closed again.

* * * * *